United States Patent
Chang et al.

(10) Patent No.: US 7,218,946 B2
(45) Date of Patent: May 15, 2007

(54) APPARATUS AND METHOD FOR PERFORMING AN OUTER LOOP POWER CONTROL IN A MOBILE COMMUNICATION SYSTEM

(75) Inventors: In-Bum Chang, Songnam-shi (KR); Ki-Ho Cho, Songnam-shi (KR); Chan-Byoung Chae, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 383 days.

(21) Appl. No.: 10/342,084

(22) Filed: Jan. 14, 2003

(65) Prior Publication Data

US 2003/0134656 A1 Jul. 17, 2003

(30) Foreign Application Priority Data

Jan. 14, 2002 (KR) .................. 10-2002-0001979

(51) Int. Cl.
  *H04Q 7/20* (2006.01)
  *H04B 7/00* (2006.01)
  *H04B 7/216* (2006.01)
(52) U.S. Cl. .................. 455/522; 455/69; 455/127.1; 370/335
(58) Field of Classification Search ............ 455/522, 455/423, 69, 13.6, 452.2, 453, 504, 127.1, 455/68, 13.4; 375/262; 370/342, 335, 262
See application file for complete search history.

(56) References Cited

U.S. PATENT DOCUMENTS

| | | | |
|---|---|---|---|
| 6,341,225 B1 * | 1/2002 | Blanc .................. | 455/522 |
| 6,405,052 B1 * | 6/2002 | Faber .................. | 455/522 |
| 6,782,497 B2 * | 8/2004 | Yue .................. | 714/704 |
| 6,842,625 B2 * | 1/2005 | Francl et al. .......... | 455/522 |
| 6,856,813 B2 * | 2/2005 | Baker et al. .......... | 455/522 |
| 7,027,829 B1 * | 4/2006 | Laakso et al. ......... | 455/522 |
| 7,058,038 B2 * | 6/2006 | Yi et al. .............. | 370/335 |
| 7,072,306 B2 * | 7/2006 | Blessent .............. | 370/252 |
| 2002/0018453 A1 * | 2/2002 | Yu et al. .............. | 370/333 |

\* cited by examiner

*Primary Examiner*—Tilahun Gesesse

(74) *Attorney, Agent, or Firm*—The Farrell Law Firm

(57) ABSTRACT

An outer loop power control apparatus and method in a mobile communication system are disclosed. If a first received frame has no errors and the raw BER of the first received frame is equal to or greater than a predetermined raw BER, a power control mode is changed to an adjustment mode. If a second received frame following the first received frame has no errors and the raw BER of the second received frame is less than the threshold raw BER in the adjustment mode, a target Eb/No is decreased by a product of a first step coefficient and a decrement unit. If the raw BER of the second received frame is equal to or greater than the threshold raw BER, the raw BERs of the first and second received frames are compared. If the raw BER of the second received frame is less than the raw BER of the first received frame, the target Eb/No is decreased by a product of a second step coefficient and the decrement unit.

19 Claims, 3 Drawing Sheets

APPARATUS AND METHOD FOR PERFORMING AN OUTER LOOP POWER CONTROL IN A MOBILE COMMUNICATION SYSTEM

PRIORITY

This application claims priority to an application entitled "Apparatus and Method for Performing Outer Loop Power Control in a Mobile Communication System" filed in the Korean Industrial Property Office on Jan. 14, 2002 and assigned Serial. No. 2002-1979, the contents of which are hereby incorporated by reference.

BACKGROUND OF THE INVENTION

1. Field of the Invention

The present invention relates generally to a mobile communication system, and in particular, to an outer loop power control apparatus for setting a target energy-to-noise ratio (Eb/No) adaptively according to channel condition, and a method thereof.

2. Description of the Related Art

A CDMA (Code Division Multiple Access) mobile communication system is comprised of Node Bs, RNCs (Radio Network Controllers), and UEs (User Equipments). Each Node B performs downlink TPC (Transmit Power Control) and uplink TPC to minimize interference between UEs within its cell and interference from other Node Bs. The downlink TPC controls the power of a downlink signal transmitted from the Node B to a UE, and the uplink TPC controls the power of an uplink signal transmitted from the UE to the Node B. The downlink and uplink TPCs are commonly performed by open loop power control, closed loop power control, and outer loop power control.

Those power control methods will be described below.

(1) Open Loop Power Control

A UE measures the propagation loss of a particular downlink channel signal, for example, a P-CCPCH (Primary Common Control Physical CHannel) signal received from a serving Node B and controls its uplink transmission power according to the propagation loss measurement, to thereby allow the Node B to receive an uplink channel signal reliably.

The P-CCPCH delivers information about the Node B and system information (SI) to UEs within the service area of the Node B. The P-CCPCH is transmitted with a constant transmission power and information about the transmission power of the P-CCPCH is broadcast to the UEs. Thus, the UE can measure the propagation loss during the P-CCPCH transmission based on its transmission power. Hence, an initial target SIR (Signal-to-Interference Ratio) is set by the open loop power control.

(2) Closed Loop Power Control

The UE measures the strength, that is, an SIR of a downlink channel signal received from the Node B. If the SIR is less than a target SIR, the UE transmits to the Node B a TPC command requesting an increase in the transmission power of the downlink channel signal. Alternatively, if the SIR is equal to or greater than the target SIR, the UE transmits to the Node B a TPC command requesting a decrease in the transmission power of the downlink channel signal. The Node B then controls its transmission power according to the TPC command received from the UE.

(3) Outer Loop Power Control

The above-described closed loop power control is based on an SIR. However, the quality of a radio channel signal is evaluated based on an FER (Frame Error Rate) rather than the SIR in an actual mobile communication system. The FER indicates an error rate limit for a digital signal required to provide good voice quality. The FER is closely related to user satisfaction with communication quality. Therefore, an FER at which the quality of a radio channel signal is maintained at an desirable level, that is, a target FER, is set according to the characteristics of a mobile communication system.

If a power control is performed in the closed loop power control method alone, an actual FER measurement varies with channel environment despite a same SIR. As a result, the FER measurement is above or below the target FER, leading to an inefficient use of the entire system capacity. That is, the relation between the SIR and the FER changes irregularly due to external factors including a channel environment and a velocity of the UE.

In this context, there is a need for a power control that maintains the target FER for use in the closed loop power control by changing the target SIR adaptively according to the channel condition. This power control is an outer loop power control. The outer loop power control method changes the target SIR used in the closed loop power control adaptively according to the channel condition in order to maintain a particular performance characteristic such as the target FER.

In the CDMA mobile communication system, if the outer loop power control is adopted, the quality of a received frame is determined by CRC (Cyclic Redundancy Check). If it turns out that the frame has errors, a target Eb/No is increased by a predetermined increment unit up_step. On the contrary, if the frame has no errors, the target Eb/No is decreased by a predetermined decrement unit down_step. The target Eb/No is used in the concept of the target SIR herein.

The increment unit up_step and the decrement unit down_step are in the relation expressed as $$\text{up\_step} = K \times \text{down\_step} \quad (1)$$

The variable K is calculated by $$K = \frac{1}{reqd \cdot FER} - 1 \quad (2)$$

where reqd.FER is a required FER for a received frame.

As a plurality of frames are successively received during communications, the FER eventually converges to the reqd.FER as noted from Eq. (1) and Eq. (2). As stated above, reqd.FER is a target FER for a corresponding channel. For example, if reqd.FER is $10^{-2}$ and K×down_step is 0.5[dB], K is 99 by the above equations. When a received fame has errors, its transmission power is increased by 0.5[dB] and if the frame has no errors, the transmission power is decreased by $$\frac{0.5}{99} [dB].$$

In the outer loop power control, a received frame is CRC-checked as stated above. If the frame has no errors in the CRC check, a target Eb/No [dB] is decreased by a relatively small decrement unit down_step. On the contrary, if the frame has errors in the CRC check, the target EB/No [dB] is increased by a relatively great increment unit. An FER in an actual channel environment converges to a target FER by adjusting the EB/No decrement unit down_step based on the Eb/No increment unit up_step.

Despite the advantage of stable maintenance of received channel signal quality in a bad channel environment, the outer loop power control causes excess power consumption because transmission power is decreased a plurality of times, each time by a small decrement unit in a good channel environment such as indoors and increased by an increment unit greater than the decrement unit in the bad channel environment. This limitation becomes serious in a mobile communication system strictly requiring maintenance of a target FER, especially in the good channel environment.

SUMMARY OF THE INVENTION

It is, therefore, an object of the present invention to provide an outer loop power control apparatus and method for setting a target Eb/No adaptively according to channel condition in a CDMA mobile communication system.

It is another object of the present invention to provide an outer loop power control apparatus and method for minimizing power consumption in a CDMA mobile communication system.

It is a further object of the present invention to provide an outer loop power control apparatus and method for performing power control reliably with minimum power consumption under a stable channel environment in a CDMA mobile communication system.

To achieve the above and other objects, in an outer loop power control apparatus of a mobile communication system, a raw BER (Bit Error Rate) calculation unit calculates the raw BER of a received frame. A controller changes a power control mode to an adjustment mode if a first raw BER of a first received frame is equal to or greater than a predetermined threshold raw BER, decreases a target Eb/No by the product of a first step coefficient and a decrement unit if a second received frame following the first received frame has no errors and a second raw BER of the second received frame is less than the threshold raw BER, compares the second raw BER with the first raw BER if the second received frame has no errors and the second raw BER is equal to or greater than the threshold raw BER, and decreases the target Eb/No by the product of the second step coefficient and the decrement unit if the second raw BER is less than the first raw BER.

In an outer loop power control method of the mobile communication system, if a first received frame has no errors and the raw BER of the first received frame is equal to or greater than a predetermined raw BER, a power control mode is changed to an adjustment mode. If a second received frame following the first received frame has no errors and the raw BER of the second received frame is less than the threshold raw BER in the adjustment mode, a target Eb/No is decreased by the product of a first step coefficient and a decrement unit. If the raw BER of the second received frame is equal to or greater than the threshold raw BER, the raw BERs of the first and second received frames are compared. If the raw BER of the second received frame is less than the raw BER of the first received frame, the target Eb/No is decreased by the product of a second step coefficient and the decrement unit.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Upon generation of user data to be transmitted, a Node B on a transmitting side adds a CRC to the user data. After segmenting the CRC-attached data into code blocks for error correction, the Node B channel-encodes the code blocks. The encoded data blocks are rate-matched according to the length of a physical layer frame and a spreading factor (SF), for transmission to a physical layer. The rate matching is the process of adjusting the rate of the data blocks to the length of the physical layer frame by puncturing and repetition. The rate-matched data is interleaved to prevent burst errors. The interleaved data is segmented into radio frames and then transmitted to a UE.

Figure 1:
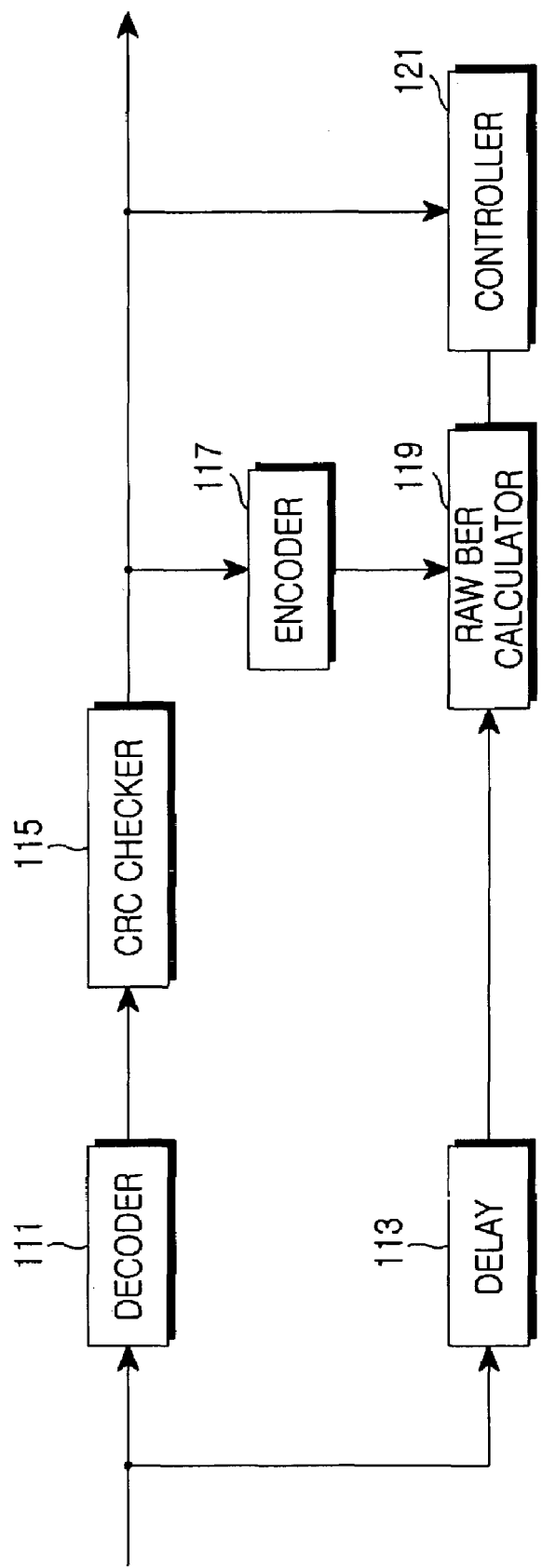
FIG. 1 is a block diagram of an outer loop power control apparatus according to an embodiment of the present invention.

FIG. 1 is a block diagram of an outer loop power control apparatus according to an embodiment of the present invention. Referring to FIG. 1, the UE receives the signal from the Node B at a decoder 111 and a delay 113. For clarity of description, it is assumed that the signal is received on a frame basis. The decoder 111 decodes the received frame in a decoding method corresponding to a channel encoding method used in the Node B. A CRC checker 115 checks the CRC of the decoded data. An encoder 117 encodes the CRC-checked data in the channel encoding method and feeds the encoded data to a raw BER (Bit Error Rate) calculator 119. The delay 113 delays the received frame by a predetermined time, that is, time required for processing in the decoder 111, the CRC checker 115, and the encoder 117, and feeds the delayed signal to the raw BER calculator 119. The raw BER calculator 119 calculates a raw BER using the data received from the encoder 117 and the delay 113. The raw BER is defined as the symbol error rate of a frame before channel decoding.

A controller 121 selects a power control mode between a normal mode and an adjustment mode according to the CRC check result and the comparison result between the raw BER and a threshold raw BER stored in a memory (not shown). In the normal mode, transmission power is controlled through control of a target Eb/No in the same manner as the conventional outer loop power control. In the adjustment mode, transmission power is controlled through control of the target Eb/No according to the raw BER. The threshold raw BER is set by adding some margin to a raw BER for the worst case where a received frame can be recovered only if it has no errors.

Figure 2:
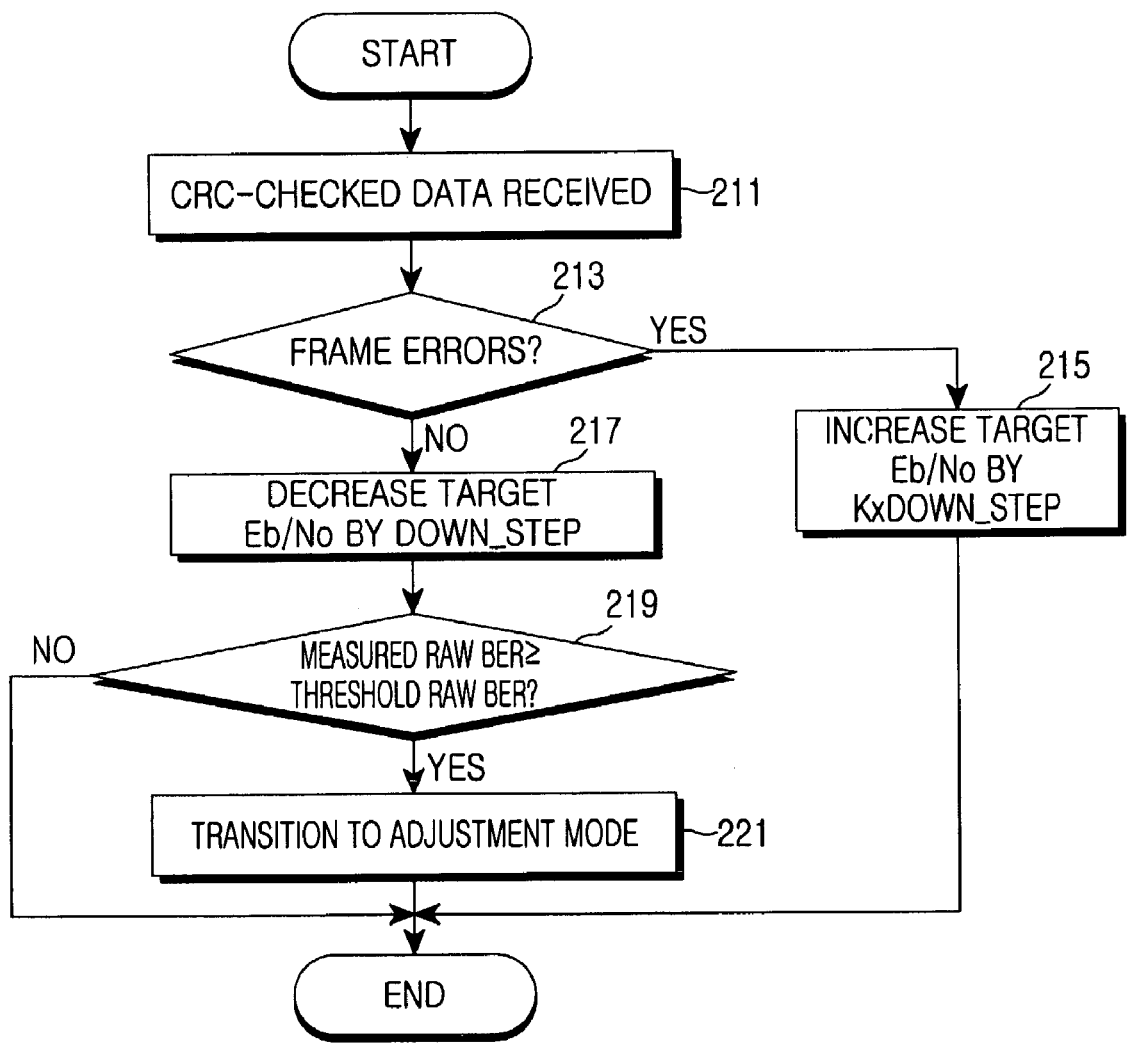
FIG. 2 is a flowchart illustrating an outer loop power control operation in a normal mode according to the embodiment of the present invention.

FIG. 2 is a flowchart illustrating an outer loop power control operation in the normal mode according to the embodiment of the present invention. Referring to FIG. 2, the decoder 111 decodes a received frame in a decoding method corresponding to a channel encoding method used in the Node B. The CRC checker 115 CRC-checks the decoded data and outputs the CRC-check result. The controller 121 receives the CRC-checked data from the CRC checker 115 in step 211 and determines whether the received data has frame errors according to the CRC-check result in step 213.

If the received frame has errors, which indicates a bad channel environment, the controller 121 increases a target EB/No set for outer loop power control by a predetermined increment unit up_step, that is, K×down_step as in the conventional outer loop power control, in step 215.

As described above, if the outer loop power control is adopted in the CDMA mobile communication system, the quality of a received frame is determined by CRC. If it is determined that the frame has errors, a target Eb/No is increased by the predetermined increment unit up_step. Conversely, if the frame has no errors, the target Eb/No is decreased by the predetermined decrement unit down_step. The target Eb/No is used in the concept of the target SIR herein. The increment unit up_step and the decrement unit down_step are in the relation that up_step=K×down_step and $$K = \frac{1}{reqd \cdot FER} - 1.$$

Here, reqd.FER is a required FER for the received frame, that is, a target FER.

In step 213, if the received frame has no errors, which indicates a good channel environment, the controller 121 decreases the target Eb/No by the decrement unit down_step in step 217. Meanwhile, after the CRC check, the encoder 117 encodes the received frame in the channel encoding method used in the Node B. The raw BER calculator 119 calculates a raw BER by comparing the channel encoded data with a frame delayed by a predetermined time and feeds the raw BER to the controller 121. In step 219, the controller 121 compares the raw BER with a predetermined threshold raw BER. If the raw BER is less than the threshold raw BER, the controller 121 ends the control operation. As the raw BER is less, the channel state is better. Thus, if the raw BER is less than the threshold raw BER, this indicates a good channel environment.

If the raw BER is equal to or greater than the threshold raw BER, which implies that the channel state is bad and thus even though the current frame has no errors, a frame error probability will increase if the target Eb/No is maintained low, the controller 121 transitions to an adjustment mode in step 221.

In the above outer loop power control illustrated in FIG. 2, when the raw BER is equal to or greater than the threshold raw BER during the normal mode operation, the power control mode is changed to the adjustment mode in order to adjust the Eb/No decrement.

Figure 3:
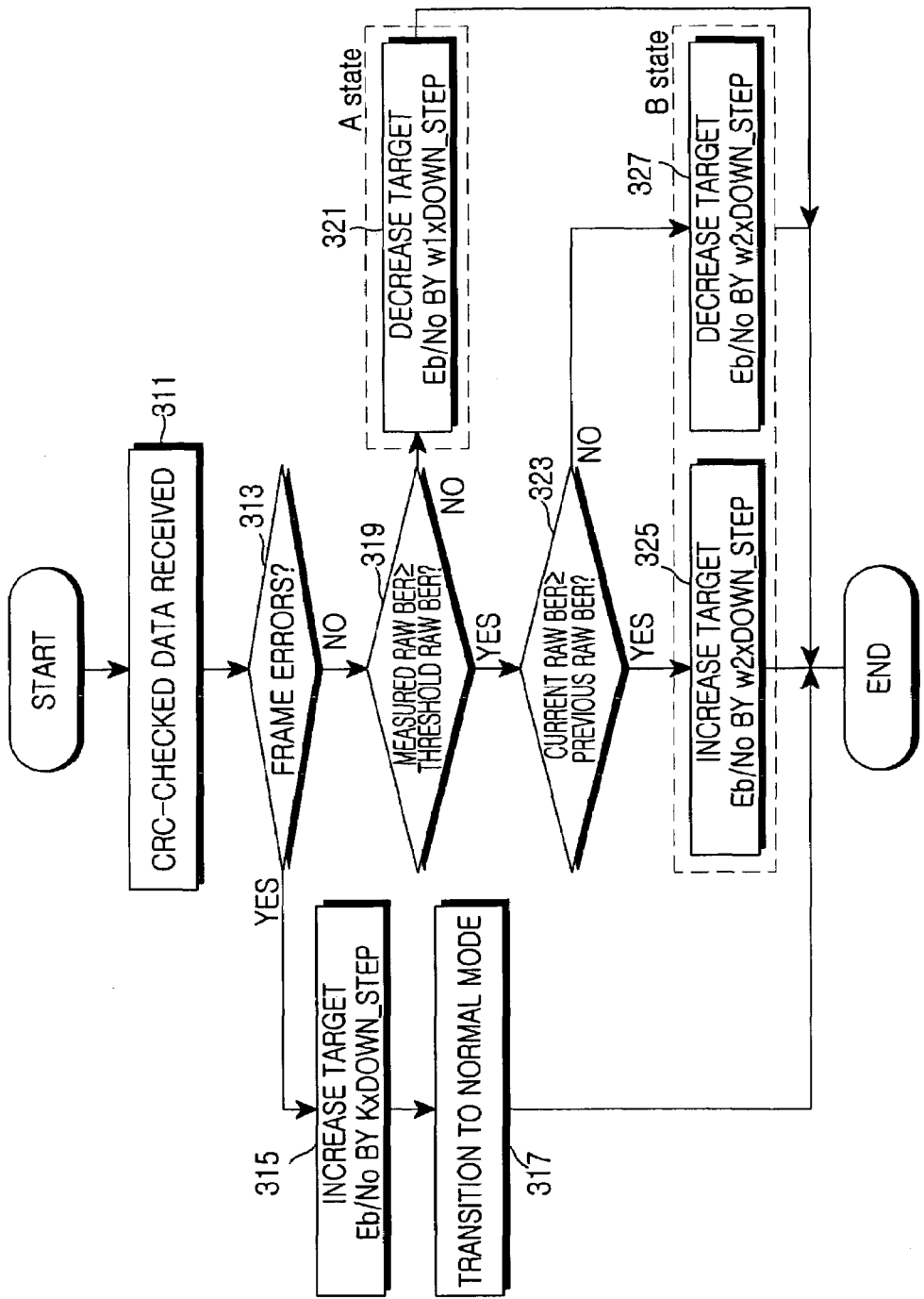
FIG. 3 is a flowchart illustrating an outer loop power control operation in an adjustment mode according to the embodiment of the present invention.

FIG. 3 is a flowchart illustrating an outer loop power control operation in the adjustment mode according to the embodiment of the present invention. In the same manner as described referring to FIG. 2, the decoder 111 decodes a received frame in the decoding method corresponding to a channel encoding method used in the Node B. The CRC checker 115 CRC-checks the decoded data and outputs the CRC-check result. The controller 121 receives the CRC-checked data from the CRC checker 115 in step 311 and determines whether the received data has frame errors according to the CRC-check result in step 313.

If the received frame has errors, which indicates a bad channel environment, the controller 121 increases the target EB/No by the increment unit up_step, that is, K×down_step, in step 315 and transitions the outer loop power control mode from the adjustment mode to the normal mode in step 317. Then the controller 121 ends the control operation.

If the received frame has no errors, which indicates a good channel environment, the controller 121 goes to step 319. Meanwhile, after the CRC check, the encoder 117 encodes the received frame in the channel encoding method used in the Node B. The raw BER calculator 119 calculates a raw BER by comparing the channel encoded data with the delayed frame and feeds the raw BER to the controller 121. In step 319, the controller 121 compares the raw BER with the threshold raw BER. If the raw BER is less than the threshold raw BER, the controller 121 goes to step 321.

In step 321, the controller 121 decreases the target Eb/No by $w_1 \times$down_step. Step 321 is termed "A state". While the target Eb/No is decreased by the decrement unit down_step in the normal mode, it is further decreased by $w_1$ in the adjustment mode because a more stable power control is possible in the adjustment mode. $w_1$ is defined as "a first step coefficient". The first step coefficient $w_1$ is initially set to 1 in the adjustment mode. When A state is reached continuously in frames following the current frame, the first step coefficient $w_1$ is increased gradually by a predetermined first step coefficient function.

If the raw BER is equal to or greater than the threshold raw BER in step 319, the controller 121 compares the raw BER of the current frame with that of a previous frame in step 323. If the raw BER of the current frame is equal to or greater than that of the previous frame, which implies that the current channel state is worse than the previous channel state, the controller 121 increases the target Eb/No by $w_2 \times$down_step in step 325. $w_2$ is defined as "a second step coefficient". The second step coefficient $w_2$ is initially set to 1 in the adjustment mode. When step 325 is reached continuously in frames following the current frame, the second step coefficient $W_2$ is decreased gradually by a predetermined second step coefficient function.

If the raw BER of the current frame is less than that of the previous frame, which implies that the current channel state is better than the previous channel state, the controller 121 decreases the target Eb/No by $w_2 \times$down_step in step 327. The second step coefficient $w_2$ is initially set to 1 in the adjustment mode and when step 327 is reached continuously in frames following the current frame, the second step coefficient $w_2$ is decreased gradually by the second step coefficient function. Steps 325 and 327 are termed "B state".

While it has been described that the outer loop power control is performed in the UE, that is, in the context of uplink TPC, it is obvious that the Node B can control a target Eb/No according to the raw BER. In this case, the UE transmits the raw BER measurement to the Node B on a predetermined channel. The Node B then sets the target Eb/No in the same manner as the controller 121 operates and transmits the target Eb/No to the UE on a predetermined channel. The UE updates its target Eb/No with the received target Eb/No.

In accordance with the present invention, a different target Eb/No is adaptively set in a normal mode or an adjustment mode according to channel condition in an outer loop power control of a CDMA mobile communication system. Therefore, power control efficiency is increased, power consumption is minimized, and system capacity is increased.

While the invention has been shown and described with reference to a preferred embodiment thereof, it will be understood by those skilled in the art that various changes in form and details may be made therein without departing from the spirit and scope of the invention as defined by the appended claims.

What is claimed is:

1. An outer loop power control apparatus in a mobile communication system, comprising:
   a raw BER (Bit Error Rate) calculation unit for calculating a raw BER of a received frame; and
   a controller for:
   (a) if a raw BER of a present received frame is greater than or equal to a threshold raw BER, decreasing a target energy to noise ratio (Eb/No) by a product of a first step coefficient and a decrement unit,
   (b) if the raw BER of the present received frame is less than the threshold raw BER, determining if the raw BER of the present received frame is greater than or equal to a raw BER of a previous received frame, and
   (c) if the raw BER of the present received frame is less than the raw BER of the previous received frame, decreasing the target energy to noise ratio (Eb/No) by a product of a second step coefficient and the decrement unit.

2. The outer loop power control apparatus of claim 1, wherein if the raw BER of the present received frame is greater than or equal to raw BER of the previous received frame, the controller increases the target Eb/No by the product of the second step coefficient and the decrement unit.

3. The outer loop power control apparatus of claim 1, wherein if the present received frame has errors, the controller increases the target Eb/No by an increment unit.

4. The outer loop power control apparatus of claim 1, wherein the raw BER calculation unit comprises:
   a delay for delaying a received frame by a predetermined time;
   an encoder for encoding the received frame after a CRC check; and
   a raw BER calculator for calculating the raw BER by comparing the delayed frame with the encoded frame.

5. The outer loop power control apparatus of claim 1, wherein if the controller continuously decreases the target Eb/No by the product of the first step coefficient and the decrement unit in frames following the present received frame, the controller gradually increases the first step coefficient for each of the following frames.

6. The outer loop power control apparatus of claim 5, wherein the first step coefficient is initially set to 1.

7. The outer loop power control apparatus of claim 1, wherein if the controller continuously decreases the target Eb/No by the product of the second step coefficient and the decrement unit in frames following the present received frame, the controller gradually decreases the second step coefficient for each of the following frames.

8. The outer loop power control apparatus of claim 7, wherein the second step coefficient is initially set to 1.

9. The outer loop power control apparatus of claim 1, wherein if the controller continuously increases the target Eb/No by the product of the second step coefficient and the decrement unit in frames following the present received frame, the controller gradually decreases the second step coefficient for each of the following frames.

10. The outer loop power control apparatus of claim 9, wherein the second step coefficient is initially set to 1.

11. An outer loop power control method in a mobile communication system, comprising the steps of:
    if a present received frame has no errors, comparing a raw BER (Bit Error Rate) of the present received frame with a threshold raw BER;
    if the raw BER of the present received frame is greater than or equal to the threshold raw BER, decreasing a target energy-to-noise ratio (Eb/No) by a product of a first step coefficient and a decrement unit;
    if the raw BER of the present received frame is less than the threshold raw BER, comparing the raw BER of the present received frame with a raw BER of a previously received frame preceding the present received frame; and
    if the raw BER of the present received frame is less than the raw BER of the previously received frame, decreasing the target Eb/No by the product of a second step coefficient and the decrement unit.

12. The outer loop power control method of claim 11, further comprising the step of increasing the target Eb/No by the product of the second step coefficient and the decrement unit if the raw BER of the present received frame is greater than or equal to raw BER of the previously received frame.

13. The outer loop power control method of claim 12, further comprising the step of gradually decreasing the second step coefficient for each of frames following the present received frame if the target Eb/No is continuously increased for the following frames by the product of the second step coefficient and the decrement unit.

14. The outer loop power control method of claim 13, wherein the second step coefficient is initially set to 1.

15. The outer loop power control method of claim 11, further comprising the step of increasing the target Eb/No by an increment unit if at least one of the previously received frame and the present received frame has errors.

16. The outer loop power control method of claim 11, further comprising the step of gradually increasing the first step coefficient for each of frames following the present received frame if the target Eb/No is continuously decreased for the following frames by the product of the first step coefficient and the decrement unit.

17. The outer loop power control method of claim 16, wherein the first step coefficient is initially set to 1.

18. The outer loop power control method of claim 11, further comprising the step of gradually decreasing the second step coefficient for each of frames following the present received frame if the target Eb/No is continuously decreased for the following frames by the product of the second step coefficient and the decrement unit.

19. The outer loop power control method of claim 18, wherein the second step coefficient is initially set to 1.

* * * * *